(12) United States Patent
Feess et al.

(10) Patent No.: US 10,735,512 B2
(45) Date of Patent: Aug. 4, 2020

(54) MANAGING DATA

(71) Applicant: MyGnar, Inc., Los Angeles, CA (US)

(72) Inventors: Tim Feess, Los Angeles, CA (US); William Africano, Santa Monica, CA (US); Patrick McGuire, Santa Monica, CA (US)

(73) Assignee: MyGnar, Inc., Los Angeles, CA (US)

( * ) Notice: Subject to any disclaimer, the term of this patent is extended or adjusted under 35 U.S.C. 154(b) by 39 days.

(21) Appl. No.: 14/628,653

(22) Filed: Feb. 23, 2015

(65) Prior Publication Data
US 2016/0246766 A1    Aug. 25, 2016

(51) Int. Cl.
*H04L 29/06* (2006.01)
*H04L 29/08* (2006.01)
*G11B 27/031* (2006.01)

(52) U.S. Cl.
CPC ........ *H04L 67/1097* (2013.01); *G11B 27/031* (2013.01); *H04L 69/04* (2013.01)

(58) Field of Classification Search
CPC ....................................................... G06F 17/24
See application file for complete search history.

(56) References Cited

U.S. PATENT DOCUMENTS

| | | | |
|---|---|---|---|
| 5,598,279 A | 1/1997 | Ishii et al. | |
| 8,509,488 B1* | 8/2013 | Enge et al. | G06K 9/20 |
| 8,630,512 B2* | 1/2014 | Swenson et al. | G06K 9/54 |
| 8,768,142 B1* | 7/2014 | Ju | H04N 21/274 386/224 |
| 8,824,751 B2 | 9/2014 | Wise | |
| 8,855,460 B2 | 10/2014 | Lussier et al. | |
| 9,286,940 B1* | 3/2016 | Ju et al. | H04N 5/77 |
| 2006/0004834 A1 | 1/2006 | Pyhalammi et al. | |
| 2007/0239787 A1* | 10/2007 | Cunningham et al. | G06F 17/00 |
| 2008/0016245 A1* | 1/2008 | Cunningham et al. | G06F 15/16 |
| 2008/0032739 A1 | 2/2008 | Hoodbhoy et al. | |
| 2008/0102892 A1 | 5/2008 | Louks et al. | |
| 2008/0244677 A1* | 10/2008 | Yamamoto | H04H 60/27 725/116 |
| 2008/0313057 A1* | 12/2008 | Gooch | G06Q 10/00 705/26.1 |

(Continued)

FOREIGN PATENT DOCUMENTS

EP          2544184 A1       1/2013

OTHER PUBLICATIONS

Brathwaite: "3 Cloud-based Photo Editing Tools at Your Service" (Dec. 31, 2011).

(Continued)

*Primary Examiner* — James J Debrow
(74) *Attorney, Agent, or Firm* — Timothy W. Menasco, Esq.; Harter Secrest & Emery LLP

(57) ABSTRACT

The present disclosure provides a method, apparatus, and computer-readable medium for managing data. A method includes creating, by a first user equipment (UE), a data, and transferring, by the first UE, the data to a server. The method further includes editing, by a second UE, the data, the second UE comprising persistent memory, wherein only a portion of the data is maintained in the persistent memory of the second UE during the editing, and in response to completion of the editing, automatically removing, by the second UE, the data from the persistent memory of the second UE.

9 Claims, 8 Drawing Sheets

(56) References Cited

U.S. PATENT DOCUMENTS

Figure 1:
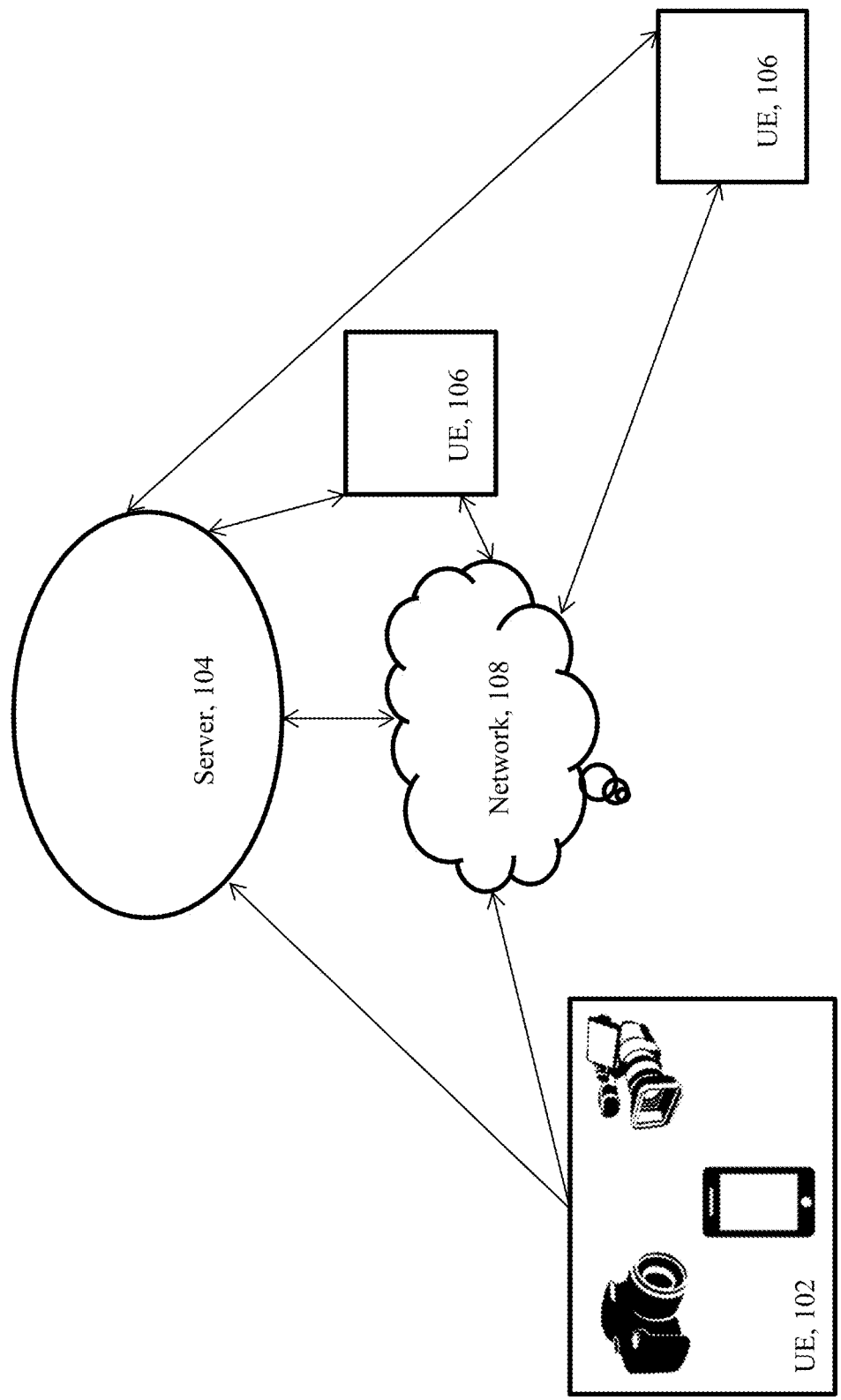

| | | |
|---|---|---|
| 2009/0030911 A1 | 1/2009 | Guo |
| 2009/0037515 A1 | 2/2009 | Zapata et al. |
| 2011/0026900 A1 | 2/2011 | Lussier et al. |
| 2012/0046770 A1 | 2/2012 | Becker et al. |
| 2013/0039361 A1 | 2/2013 | Den Hartog |
| 2013/0054837 A1 | 2/2013 | von Elgg et al. |
| 2013/0129489 A1 | 5/2013 | Spix et al. |
| 2013/0304604 A1* | 11/2013 | Hoffman ............ G06Q 30/0621 705/26.5 |
| 2013/0322857 A1 | 12/2013 | Walker et al. |
| 2013/0332857 A1 | 12/2013 | Kim et al. |
| 2014/0059624 A1 | 2/2014 | Ellis et al. |
| 2014/0304310 A1 | 10/2014 | Gerbasi, III |
| 2014/0324968 A1* | 10/2014 | D'Amore ................ H04L 67/22 709/204 |
| 2015/0019949 A1* | 1/2015 | Breard ................ G06F 17/2288 715/229 |
| 2015/0043892 A1 | 2/2015 | Groman |
| 2015/0254806 A1* | 9/2015 | Circlaeys ............. H04N 21/238 345/428 |
| 2016/0012250 A1* | 1/2016 | Demirli ................ H04W 12/02 726/28 |
| 2016/0150102 A1 | 5/2016 | Wurf et al. |
| 2016/0246766 A1* | 8/2016 | Feess et al. ............. G06F 17/24 |

OTHER PUBLICATIONS

Inspirationfeed.com: "4 Essential Cloud-Based Photo Editing Tools" (Dec. 31, 2013).

"SCC MediaServer Enterprise Edition" Dec. 31, 2013.

Synology website: https://www.synology.com/en-global/knolwedgebase/tutorials/r52 How to enjoy multimedia contents stored on Synology NAS with DLBA/UPnP-compliant DMAs Dec. 31, 2014.

International Search Report and Written Opinion of the International Searching Authority for PCT 2016/018939 (21 pages) completed Apr. 14, 2016.

\* cited by examiner

502: (a) creating, by a user equipment (UE), a data, the UE having a persistent memory; (b) transferring, by the UE, the data to a server; and (c) editing, by the UE, the data, wherein only a portion of the data is maintained in the persistent memory during the editing; and (d) in response to completion of the editing, automatically removing, by the UE, the data from the persistent memory.

504: wherein the data comprises videos, photographs, and audio recordings

506: wherein the server is one of a local area network device and a wide area network

508: wherein the editing comprises streaming a portion of the transferred data

510: wherein the editing comprises cutting, cropping, combining, tilting, transitioning, or filtering the data

FIG. 5

602: (a) receiving, by a server, a data; (b) transmitting, by the server, a second data, the second data being based on the data; (c) receiving, by the server, a third data, the third data comprising changes to the second data; and (d) editing, by the server, the data based on the received third data

604: wherein the data comprises videos, photographs, or audio recordings

606: wherein the second data comprises a portion of the data, and wherein the transmitting comprises streaming the second data

608: wherein the server is a local area network device

610: wherein the editing comprises cutting, cropping, combining, titling, transitioning, or filtering the data

FIG. 6

702: (a) creating, by a first user equipment (UE), a data; (b) transferring, by the first UE, the data to a server; (c) editing, by a second UE, the data, the second UE comprising persistent memory, wherein only a portion of the data is maintained in the persistent memory of the second UE during the editing; and (d) in response to completion of the editing, automatically removing, by the second UE, the data from the persistent memory of the second UE.

704: wherein the data comprises videos, photographs, and audio recordings

706: wherein the server is one of a local area network device and a wide area network 708: wherein the editing comprises streaming a portion of the transferred data to the second UE 710: wherein the editing comprises cutting, cropping, combining, titling, transitioning, or filtering the data

FIG. 7

MANAGING DATA

BACKGROUND OF THE INVENTION

Field of the Invention

Exemplary embodiments of the present disclosure relate to a method, apparatus, and computer-readable medium for managing data. Exemplary embodiments of the present disclosure relate more particularly to managing data with a user equipment.

Description of Related Art

Mass storage refers to the storage of large amounts of data in a persisting and machine-readable format. Devices and/or systems that have been described as mass storage include a variety of computer drives such as hard disk drives, magnetic tape drives, magneto-optical disc drives, optical disc drives, and solid-state drives. It also includes experimental forms like holographic memory and historic forms like drum memory, floppy disk drives and punched tape. Mass storage includes devices with removable and non-removable media. It does not include random access memory (RAM), which is volatile in that it loses its contents after power loss.

Magnetic disks are the predominant storage media in personal computers. Optical discs are almost exclusively used in the large-scale distribution of retail software, music and movies because of the cost and manufacturing efficiency of the molding process used to produce digital video discs (DVDs), and compact discs, and reader drives, which are used in personal computers and consumer appliances. Flash memory has an established and growing niche as a replacement for magnetic hard disks in high performance enterprise computing installations due to its robustness stemming from its lack of moving parts, and its inherently much lower latency when compared to conventional magnetic hard drive solutions. Flash memory has also long been popular as removable storage such as universal serial bus (USB) sticks. This is due to the fact that it scales better cost-wise in lower capacity ranges, as well as its durability. It has also made its way onto laptops in the form of solid state drives (SSDs). One of the advantages of flash memory is its high degree of resistance to physical impact, as well as a performance increase over conventional magnetic hard disks and markedly reduced weight and power consumption.

A digital camera is a camera that encodes digital images and videos digitally and stores them for later reproduction. Most cameras sold today are digital, and digital cameras are incorporated into many devices ranging from PDA and mobile phones to vehicles. Unlike film cameras, digital cameras typically are able to display images on a screen immediately after being recorded, and store and delete images from memory. Many digital cameras can also record moving videos with sound. Some digital cameras can crop and stitch pictures and perform other elementary image editing.

BRIEF SUMMARY OF THE INVENTION

In view of the foregoing, it is an object of the present disclosure to provide a method, apparatus, and computer-readable medium for managing data.

A first exemplary embodiment of the present disclosure provides a method for managing data. The method includes creating, by a user equipment (UE), a data, the UE having a volatile memory, and transmitting, by the UE, the data to a server. The method further includes editing, by the UE, the data, wherein the data is maintained on only the volatile memory of the UE during the editing.

A second exemplary embodiment of the present disclosure provides an apparatus for managing data. The apparatus includes at least one processor, a volatile memory and a memory storing computer instructions executable by the at least one processor, wherein the memory and the computer instructions and the at least one processor are configured to cause the apparatus to at least create a data. The memory with the computer instructions and the processor are configured to further cause the apparatus to transmit the data to a server, and edit the data, wherein the data is maintained on only the volatile memory of the apparatus during the editing.

A third exemplary embodiment of the present disclosure provides a non-transitory computer-readable medium tangibly storing computer program instructions which when executed by a processor, cause the processor to at least create a data. The computer program instructions further cause the processor to transmit the data to a server, and edit the data, wherein the data is maintained on only a volatile memory of a UE during the editing.

A fourth exemplary embodiment of the present disclosure provides a method for managing data. The method includes receiving, by a server, a data, and transmitting, by the server, a second data, the second data being based on the data. The method further includes receiving, by the server, a third data, the third data comprising changes to the second data, and editing, by the server, the data based on the received third data.

A fifth exemplary embodiment of the present disclosure provides an apparatus for managing data. The apparatus includes at least one processor and a memory storing computer instructions executable by the at least one processor, wherein the memory and the computer instructions and the at least one processor are configured to cause the apparatus to at least receive a data, and transmit a second data, the second data being based on the data. The memory with the computer instructions and the processor are configured to further cause the apparatus to receive a third data, the third data comprising changes to the second data, and editing the data based on the received third data.

A sixth exemplary embodiment of the present disclosure provides a non-transitory computer-readable medium tangibly storing computer program instructions which when executed by a processor, cause the processor to at least receive a data, and transmit a second data, the second data being based on the data. The computer program instructions further cause the processor to receive a third data, the third data comprising changes to the second data, and editing the data based on the received third data.

A seventh exemplary embodiment of the present disclosure provides a method for managing data. The method includes (a) accessing, by a user equipment (UE), a data, the UE having a volatile memory, and receiving, by the UE, a portion of the data. The method further includes editing, by a UE, the data, wherein the data is maintain on only the volatile memory of the UE during the editing.

An eighth exemplary embodiment of the present disclosure provides an apparatus for managing data. The apparatus includes at least one processor, a volatile memory and a memory storing computer instructions executable by the at least one processor, wherein the memory and the computer instructions and the at least one processor are configured to cause the apparatus to at least access a data. The memory with the computer instructions and the processor are configured to further cause the apparatus to receive a portion of the data, and edit the data, wherein the data is maintain on only the volatile memory of the apparatus during the editing.

A ninth exemplary embodiment of the present disclosure provides a non-transitory computer-readable medium tangibly storing computer program instructions which when executed by a processor, cause the processor to at least access a data. The computer program instructions further cause the processor to receive a portion of the data, and edit the data, wherein the data is maintain on only the volatile memory of a UE during the editing A tenth exemplary embodiment of the present disclosure provides a method for managing data. The method includes creating, by a first user equipment (UE), a data, and transferring, by the first UE, the data to a server. The method further includes editing, by a second UE, the data, the second UE comprising persistent memory, wherein only a portion of the data is maintained in the persistent memory of the second UE during the editing, and in response to completion of the editing, automatically removing, by the second UE, the data from the persistent memory of the second UE.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

FIG. 1 presents a simplified signaling diagram between devices suitable for use in practicing exemplary embodiments of this disclosure.

Figure 2:
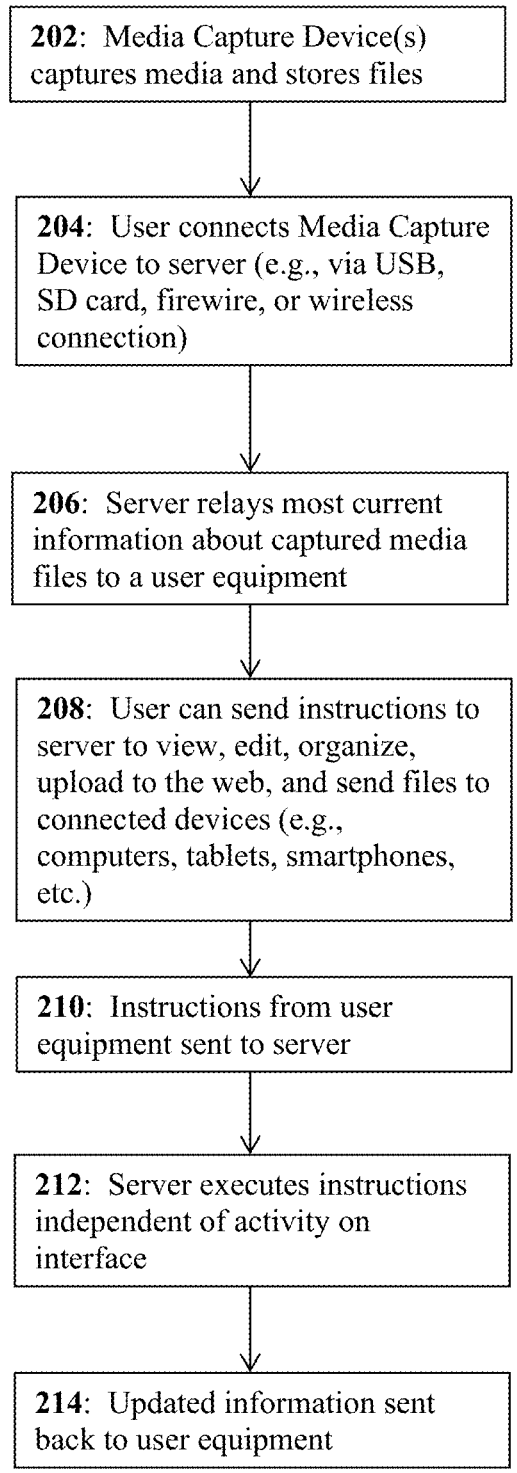

FIG. 2 presents a flowchart suitable for use in practicing exemplary embodiments of this disclosure.

Figure 3:
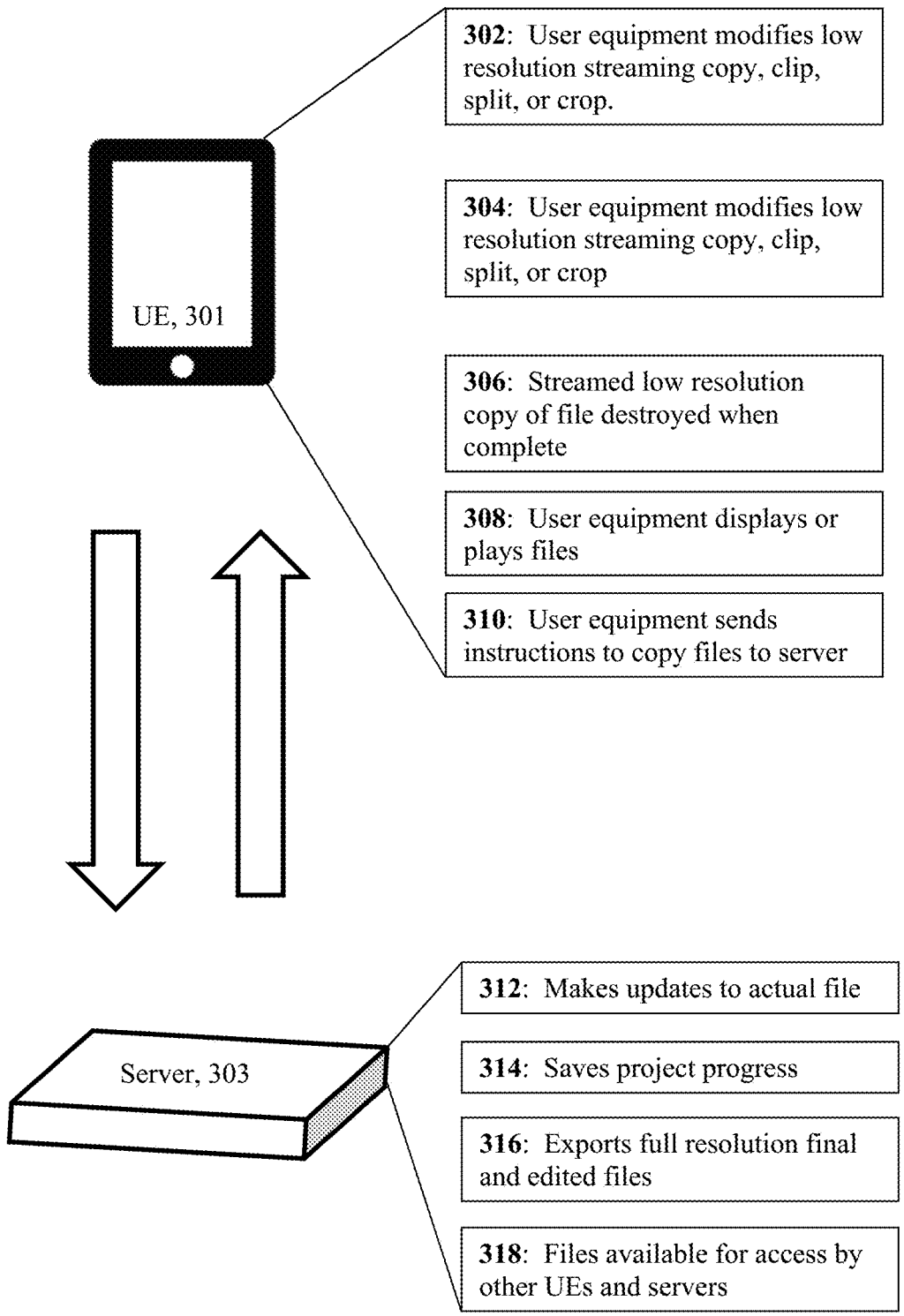

FIG. 3 presents block diagram suitable for use in practicing exemplary embodiments of this disclosure.

Figure 4:
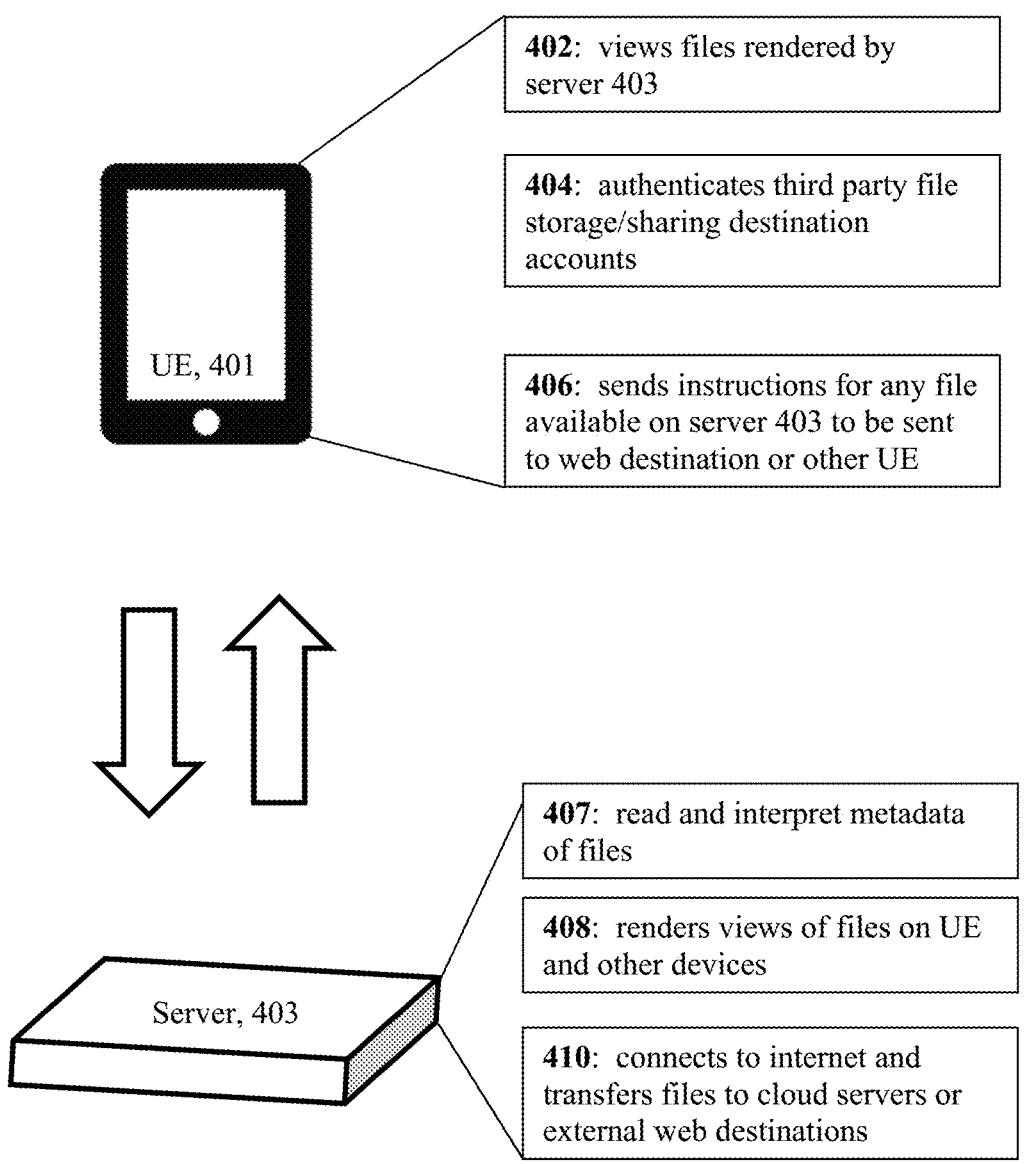

FIG. 4 presents another block diagram suitable for use in practicing exemplary embodiments of this disclosure.

FIG. 5 presents a logic flow diagram in accordance with a method, apparatus, and computer-readable medium for performing exemplary embodiments of this disclosure.

FIG. 6 presents an alternative logic flow diagram in accordance with a method, apparatus, and computer-readable medium for performing exemplary embodiments of this disclosure.

FIG. 7 presents yet another logic flow diagram in accordance with a method, apparatus, and computer-readable medium for performing exemplary embodiments of this disclosure.

Figure 8:
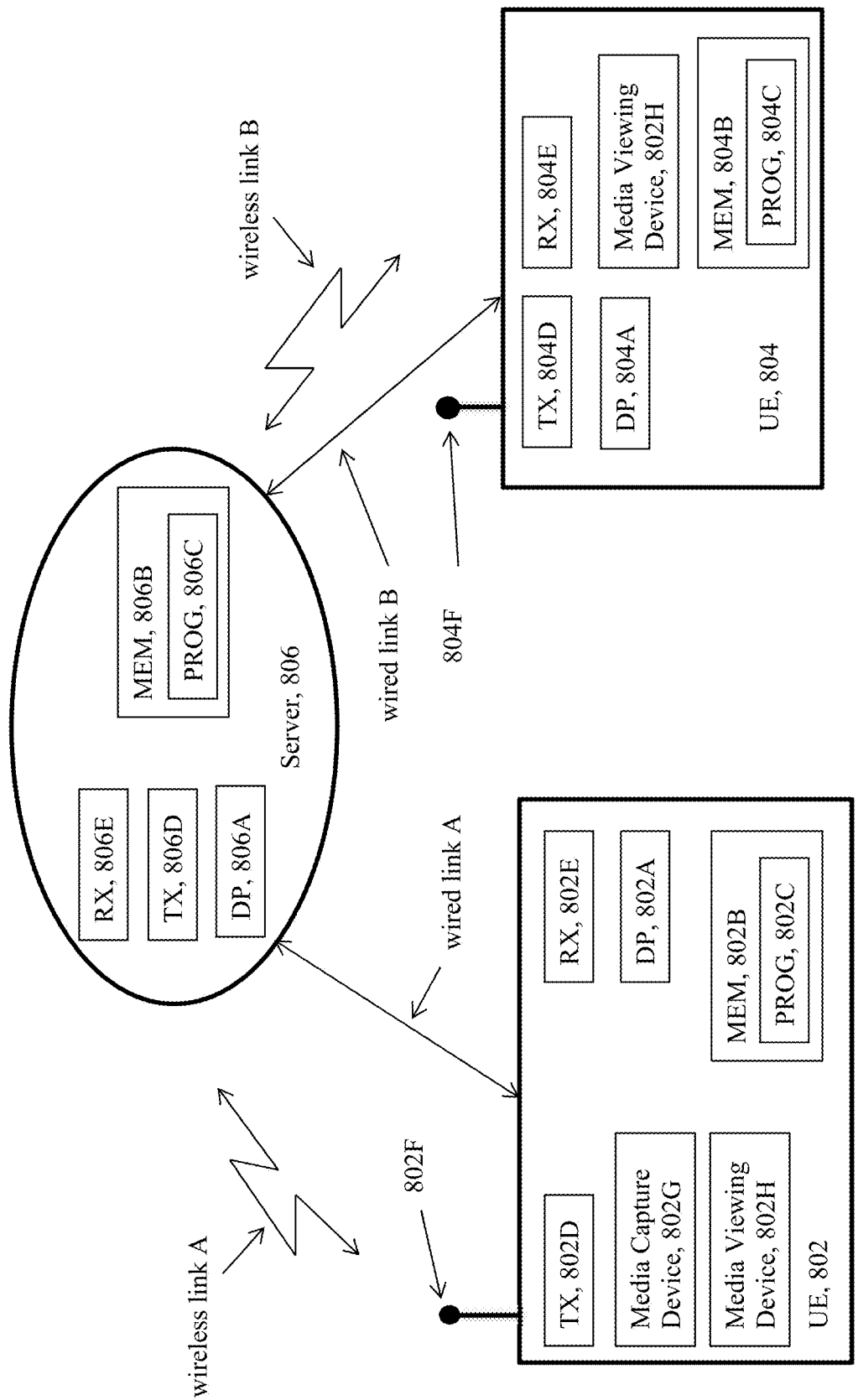

FIG. 8 presents a simplified block diagram of the devices suitable for use in practicing exemplary embodiments of this disclosure

DETAILED DESCRIPTION OF THE INVENTION

There are numerous electronic devices sold on the market to both companies and the everyday consumer that are able to take or record vast amounts of audio and/or video. Many of these audio and/or video recording devices or media capture devices have the capability of taking extremely high quality and high definition recordings. One of the consequences of high quality and high definition recordings or files is the fact they typically are quite large and thus require a large amount of hard disk memory to maintain the files. In most cases, high definition recordings use or require a majority if not all of the available hard disk space on the recording device or media capture device. High definition recordings can also put a strain on the processing power and processing speed of a recording device or media capture device. If the high definition recordings are transferred between devices, the recordings can have the same effect on the power and speed of the network in which the recordings are transferred. This can be problematic for the user of the media capture device, especially because the user often wants, needs, or is required to use the media capture device over and over again to record new audio and/or video files.

Moreover, most users are not simply satisfied with the original audio and/or video files. A user typically will want to view and edit the audio and/or video files prior to publishing or showing the files to others. Some media capture devices include the ability to edit and view recorded audio and/or video files as the files reside on the media capture device. However, most media capture devices either have limited editing capabilities or simply do not have the hard disk space the user requires to both maintain existing recorded audio and/or video files and allow the user to record new audio and/or video files. Most media capture devices allow a user to download the audio and/or video content to a desktop or laptop computer. Yet, even desktop and laptop computers have a finite amount of storage space. As such, there is a need to allow users to free up storage space in their media capture devices yet also provide means for editing and viewing of the captured audio and/or video files.

Exemplary embodiments of the present disclosure provide a method, apparatus, and computer-readable medium for managing data or files in a manner that addresses the above referenced issues. For instance, exemplary embodiments of the present disclosure allow a user to free up storage space on their media capture devices and also provides a means for editing and managing data, media, or files with the media capture device or other electronic devices or user equipments.

Referring to FIG. 1, shown is a simplified signaling diagram between devices suitable for use in practicing exemplary embodiments of this disclosure. Shown in FIG. 1 is user equipment (UE) 102, server 104, two UEs 106, and network 108. Exemplary embodiments of UE 102 are able to capture or record and maintain audio and/or video files. Exemplary embodiments of UE 102 are illustrated in FIG. 1, which include cameras, digital cameras, digital video cameras, cell phones, mobile phones, smart phones, tablets, laptop, desktop computers, and the like. Exemplary embodiments of UE 102 typically include at least one processor, at least one memory storing at least one computer program, at least one transmitter, and at least one user interface. In one exemplary embodiment, the at least one memory of UE 102 is persistent memory, which includes any type of memory known in the art that can continue to be accessed using memory instructions or memory application program interfaces even after the end of the process that created or last modified them. In another exemplary embodiment, the at least one memory of UE 102 is volatile memory, which is memory that requires power to maintain the stored information, it retains its contents while powered on, but when the power is interrupted the stored data is immediately lost. In yet another exemplary embodiment, the at least one memory of UE 102 includes both volatile memory and persistent memory. UE 102 is able to send or transmit via the at least one transmitter, its captured audio and/or video files through wired or wireless connections to server 104 directly or indirectly to server 104 through network 108.

In some exemplary embodiments UE 102 is capable of wired or wireless bidirectional communication with server 104 through the at least one transmitter and at least one receiver, directly or indirectly through network 108 such that UE 102 can transmit captured media and is then able to view, manipulate, manage, and edit media located on server 104 in accordance with embodiments described below.

Communication between UE 102 and server 104 can be performed over a local area network (LAN), wide area network (WAN), or a combination of both networks. Communication between UE 102 and server 104 can also include any type of network or connection that allows for the transfer of audio and/or video files and the ability to manipulate, view, and edit said audio and/or video files.

Server 104 includes any type of server that is known in the art such as private servers, web servers or cloud servers, and also including commercial servers such as Amazon. Exemplary servers 104 include one or multiple processors, memories, transmitters and receivers for transmitting and receiving data wired or wirelessly. Exemplary embodiments of server 104 include a single server and multiple servers. Exemplary embodiments of server 104 can include servers that are publically accessible or private servers that can only be accessed by a finite number of entities that are connected or authorized to connect to server 104. Exemplary embodiments of server 104 are able to communicate or transmit and receive data or audio and/or video files wired or wirelessly from UE 102 and UEs 106. Exemplary embodiments of server 104 are also able to communicate with UE 102 and UEs 106 through network 108.

Exemplary embodiments of server 104 are also able to manipulate, manage, transmit, receive, and edit audio and/or video files maintained within its memory or located on its hard disk. Exemplary embodiments of server 104 are further able to transmit and receive portions of audio and/or video files located in its memory or located on its hard disk. For instance, server 104 is able to stream to UE 102, and UEs 106 either directly or indirectly through network 108 portions or copies of portions of audio and/or video files. Exemplary embodiments of server 104 are then able to edit, change, or otherwise alter audio and/or video files.

Network 108 includes any type of network that provides for the transmission of audio and/or video files. Exemplary embodiments of network 108 include LAN, WAN, public networks, private networks, and the internet. Network 108 is able to send and receive communications and data to UE 102, server 104, and UEs 106.

Exemplary embodiments of UEs 106 include any type of electronic device or user equipment (UE) that provides a user interface that allows the user to manage, manipulate, view, and edit audio and/or video files, and is capable of wired or wireless communication. Exemplary embodiments of UEs 106 include a processor, an input/output interface such as a display, a memory, a transmitter, and a receiver for transmitting and receiving data wired or wirelessly. In one exemplary embodiment UEs 106 include persistent memory, which includes any type of memory that can continue to be accessed using memory instructions or memory application program interfaces (API) even after the end of the process that created or last modified them. In another exemplary embodiment, the memory of UEs 106 is volatile memory that requires power to maintain the stored information, it retains its contents while powered on, but when the power is interrupted the stored data is immediately lost. In yet another exemplary embodiment, the memory of UEs 106 include both volatile memory and persistent memory. Exemplary embodiments of UEs 106 include tablets, laptop computers, desktop computers, cell phones, mobile phones, smart phones, and portable electronic devices. Exemplary embodiments of UEs 106 are able to communicate or transmit and receive data from server 104. Exemplary embodiments of UEs 106 are also able to receive portions of audio and/or video files, such as through streaming and are able to edit, manipulate, and manage the streaming files. The received portions of the audio and/or video files can be maintained on persistent memory of UEs 106 in one embodiment. In another embodiment, the received portions of the audio and/or video files can be maintain on volatile memory of UEs 106. Exemplary embodiments of UEs 106 are then able to transmit back to server 104 edited, manipulated, and managed versions of the streamed files. UEs 106 are then able to remove or delete the received audio and/or video files from the memory of the UE 106 when the editing has been completed. In one exemplary embodiment, the removal or deletion of the received audio and/or video files from the memory of the UE 106 is performed automatically in response to completion of editing. UEs 106 are able to communicate with server 104 directly or indirectly through network 108 by either wired or wireless connections.

Referring to FIG. 2, presented is an exemplary flowchart suitable for use in practicing exemplary embodiments of this disclosure. The flowchart in FIG. 2 presents an exemplary process for capturing audio and/or video files or other media, uploading or transmitting the captured media to a server, and streaming the media to a media capture device or other user equipment for viewing, editing, and managing data or files. The process begins at block 202 wherein the media capture device captures the media and stores the files or media internally on the media capture device. Exemplary embodiments of files or media include audio and/or video files such as high-definition videos.

Most media capture devices have a finite storage capacity. Accordingly, a user will want to upload, download, or move the recorded or captured media from the media capture device to some other location such that the media capture device can be further used to capture or record new media. The process continues at block 204 when the user will connect the media capture device to a server and upload, download, or otherwise transfer the captured media to the server. The media can be transferred through wired or wireless connections, such as through universal serial bus (USB), secure digital (SD) card, firewire, or Ethernet cables. In some exemplary embodiments, the captured media will be removed or deleted from the media capture device once the media has been transferred to the server. In other exemplary embodiments, a copy of the captured media will remain on the media capture device even after the captured media has been transferred to the server.

The process continues at block 206 wherein the server relays the most current information about the captured media files to a user equipment or to the media capture device. In exemplary embodiments, the server is able to sense when the media capture device or other user equipments have accessed or connected to the server, at which point the server will relay information regarding the files it maintains. For example, the server may relay information to the media capture device and the user equipment that there is media available, wherein a portion or portions of the captured media may be streamed to the user equipment or the media capture device, which can be viewed, edited, or organized by the user equipment or the media capture device. Exemplary embodiments of the present disclosure contemplate that in some embodiments the media capture device and multiple user equipments will be able to receive streamed portions of the captured media from the server and will be able to edit, view, manipulate, and organize the streamed portions of the media.

At block 208, the user, through the media capture device or through the user equipment can send instructions to the server to view, edit, organize, upload to the web, and send to the user equipment or to the connected devices the captured media. Some exemplary connected devices or user equipments include computers, tablets, digital cameras, external hard drives, smartphones and the like. For example, the user can send instructions to the server by interacting, editing, or organizing streamed portions of the captured media and sending it back to the server. In one exemplary embodiment, during the viewing, editing, or organizing, none of the streamed portions of the captured media are maintained in non-volatile memory or hard disk space of the media capture device or user equipment. The streamed portions of the captured media are simply maintained in volatile memory of the media capture device or user equipment.

In another exemplary embodiment, during the viewing, editing, or organizing, the streamed portions of the captured media are maintained in persistent memory of the media capture device or user equipment. In this embodiment, the streamed portions of the captured media are removed or deleted from the persistent memory of the media capture device or user equipment upon completion of the viewing, editing, or organizing.

At block 210, the instructions from the media capture device or the user equipment are sent to the server. Then at block 212 the server executes the instructions from the media capture device or the user equipment independent of activity on the interface. For example, the media capture device or the user equipment may edit the streamed portion of the captured media by removing segments of the audio and/or video file. The edited streamed portions of the captured media will be sent to the server. The server will then edit the actual captured media located and maintained on the server in accordance with the edited streamed portions of the captured media. Once the server has received the editing instructions, the server will perform the editing independent of whether the user equipment is still connected to the server and independent of other activity on the network. Finally, at block 214, the updated information or captured media will be streamed back to the user equipment or the media capture device.

Reference is now made to FIG. 3, which depicts a block diagram suitable for use in practicing exemplary embodiments of this disclosure. Shown in FIG. 3 is user equipment (UE) 301 and server 303. Exemplary embodiments of UE 301 and server 303 include those known in the art and as particularly described above. Exemplary embodiments of UE 301 include at least one processor, at least one memory storing computer program instructions, at least one transmitter, at least one receiver, and at least one media viewing/playing means such as a display and/or speakers. In one exemplary embodiment, the at least one memory is persistent memory. In another exemplary embodiment, the at least one memory is volatile memory. In yet another exemplary embodiment, the at least one memory includes both volatile and persistent memory. Exemplary embodiments of UE 301 are able to communicate, send, and receive data and files to and from server 303.

Exemplary embodiments of server 303 include any type of server known in the art including a single server as well as multiple servers and web servers. Exemplary embodiments of server 303 include at least one processor, at least one memory storing computer program instructions, at least one transmitter, at least one receiver, and the ability to communicate, send, and receive data and files to and from UE 301. Exemplary embodiments of server 303 are also able to stream portions of a data, file, or media to UE 301 or multiple UEs, and is able to receive instructions to edit, manipulate, manage, or organize said data, file, or media, and then carry out said instructions.

Exemplary processes and capabilities of UE 301 and server 303 depicted in FIG. 3 begin at block 302 wherein the UE modifies a low resolution streaming copy, clip, split, or crop. The low resolution streaming can include video and/or audio files, which are maintained on server 303. In one exemplary embodiment, a low resolution stream of a video and/or audio file includes any portion of the data of the original high resolution video and/or audio file that is less than 100% of the corresponding original high resolution video and/or audio file. In another exemplary embodiment, the low resolution stream of the video and/or audio file includes between 50%-75% of the corresponding portion of the data of the original high resolution video and/or audio file. In another exemplary embodiment, the low resolution stream of the video and/or audio file includes less than 10% of the corresponding portion of the data of the original high resolution video and/or audio file. Then at block 304, UE 301 modifies the low resolution streaming copy, clip, split, or crop. The modifying can include editing, cutting, cropping, combining, titling, transitioning, or filtering the low resolution streaming copy. In one exemplary embodiment, during the editing process, none of the low resolution copy is stored in persistent memory located on UE 301. Only volatile memory located on UE 301 is used during the viewing and editing of the low resolution streaming. In another exemplary embodiment, during the editing process, the low resolution copy is stored in persistent memory located on UE 301.

Once the editing is completed, block 306 indicates that the streamed low resolution copy of the file is destroyed or deleted from UE 301. Block 308 specifies that UE 301 is able to display or play the streamed files. Having completed viewing and/or editing of the streamed low resolution copy, UE 301 at block 310 sends instructions to server 303 to perform the editing on the actual files located on server 303. In another exemplary embodiment, the instructions to edit, manipulate, and manage the low resolution streaming copy sent to server 303 is sent to server 303 contemporaneously with the editing of the low resolution streaming copy performed by UE 301. In some exemplary embodiments, it should be appreciated that during the view, editing, manipulating, and managing of the low resolution streamed portion of the files, UE 301 does not maintain any portion of the streamed files in its persistent memory or hard disk space. The low resolution streamed portion of the files are only maintained on UE 301 in its volatile memory. In another exemplary embodiment, the low resolution streamed portion of the files is maintained in the persistent memory of UE 301. It should be appreciated that the deletion of the streamed low resolution copy of the file as referenced in block 306 can be performed after editing has been completed or after the user equipment sends the editing instructions to server 303 as referenced in block 310. Deletion of the streamed low resolution copy of the file can be performed in response to and automatically after completion of the editing or in response to UE 301 sending the editing instructions to server 303.

In yet another exemplary embodiment, the low resolution streamed portion of the files is maintained in the persistent memory of UE 301 only for the duration that UE 301 is streaming the files. In this embodiment, the files are automatically deleted from the non-volatile memory of UE 301 once the streaming has been stopped. In another exemplary embodiment, the files are streamed to UE 301 in high resolution rather than in low resolution.

At block 312, server 303, having received instructions from UE 301 via the streamed low resolution copy, makes updates to the actual file, media, or data maintained on and by server 303. In one exemplary embodiment, server 303 receives the edited streamed low resolution copy of the file or data and makes edits to the actual high resolution file located on server 303 based on the edited streamed low resolution copy of the file or data. In another exemplary embodiment, the edits by UE 301 of the low resolution copy of the file or data is converted into instructions for server 303. Server 303 then merely receives the instructions and edits the actual file, media, or data based on the received instructions. Server 303 is also, at block 314, able to save project progress. For instance, the user of UE 301 may be creating a feature length motion picture. This type of project usually takes hours if not hundreds of hours to complete. Accordingly, this type of project cannot be completed within a single working session. The user must save their progress in the project and then return to the project multiple times before completion. UE 301 will thus access and edit a low resolution streamed copy of the project and server 303 will save the edited progress on the actual project/file located on server 303.

Block 316 then indicates that server 303 can export full resolution copies of the files. Server 303 can export these files to other user equipments, such as computers, flash drives, smartphones, tablets and the like, or the files can be exported to cloud computing servers/web servers, such as Google Drive or Dropbox. Block 318 then states that the files located on server 303 are available for access by other UEs and servers. FIG. 3 depicts a single UE 301 that accesses and edits files located on server 303, however, exemplary embodiments of this disclosure provide that projects, media, and files located on server 303 are able to be accessed through low resolution streaming by one or multiple user equipments.

In another exemplary embodiment, UE 301 also has the capability to edit low resolution streamed versions of files maintained by server 303 by altering the associated metadata of the files. This can be performed on unedited or edited files, media, or data maintained by server 303. Server 303 then executes the edits to the metadata of the low resolution streamed versions to the actual file or files maintained on server 303. In yet another exemplary embodiment, UE 301 also has the capability to enter information including times, dates, gear, notes, friend tags, GPS information and desired backup destinations to associate with low resolution streamed versions of files maintained by server 303. Server 303 then executes and adds the information from the low resolution streamed versions to the actual file or files maintained on server 303.

Referring to FIG. 4, presented is another block diagram suitable for use in practicing exemplary embodiments of this disclosure. Shown in FIG. 4 is user equipment (UE) 401 and server 403. Exemplary embodiments of UE 401 and server 403 include those known in the art and those particularly described in this disclosure. UE 401 is able to send and receive communications with server 403 via wired or wireless connections.

Exemplary processes and capabilities of UE 401 begin at block 402 wherein the user is able to view files rendered by server 403. For instance, UE 401 can receive for viewing and/or listening a low resolution streamed file of files located on server 403. In another instance, UE 401 can simply view which files or data are available for low resolution streaming from server 403.

At block 404, UE 401 can authenticate third party file storage/sharing destination accounts. For instance, a user may want to move files or copies of files located on server 403 from server 403 to a third party location, such as Google Drive or Dropbox. The user of UE 401 is able to authenticate to server 403 and the third party file storage/sharing destination that the user has access to the files on both the server 403 and the third party file storage/sharing destination. An exemplary type of authentication can include entry of a username and password. Another exemplary type of authentication includes entry of biometric data, such as fingerprint scans. Yet another exemplary type of authentication includes the use of an authentication token associated with a UE 401 that can be maintained on UE 401. Server 403 will identify that UE 401 is allowed access to certain files through the use of the authentication token and a password.

At block 406, UE 401 can send instructions for any file available on server 403 to be sent to a web destination or other UE. For instance, UE 401 can send instructions to server 403 instructing server 403 to send a file located on server 403 to a web server, such as Google drive or Dropbox, or to another device, such as another UE. In another exemplary embodiment, a user with the use of UE 401 can send or upload files to server 403 that include metadata, which instructs server 403 as to how to organize the uploaded files on server 403 or potentially where to send the uploaded files, such as to another user equipment, server, website, or web server.

Block 407 states that server 403 can read and interpret metadata of files. Exemplary embodiments of server 403 are able to read and interpret metadata of files or data that are maintained on server 403 or sent to server 403. Exemplary embodiments of server 403 are then able to manipulate the metadata associated with the files or data and/or perform actions based on the read metadata. For instance, server 403 is able to read metadata from files that are created by a media capture device or a user equipment and are then uploaded to server 403.

Exemplary embodiments of server 403 are also able to add metadata to files maintained by server 403 using a user equipment's sensors before the media is captured, during the media capture and after the media is captured. For instance, UE 401 may access a particular file or data located on server 403 to perform edits on the file or data through low resolution streaming. Server 403 is able to add metadata to the file or data that is associated with the timing of the editing by the user equipment. Some exemplary metadata additions include timestamps, GPS information, accelerometer information, gyroscope information, temperature and weather information, camera information, audio information, and the like.

Exemplary embodiments of server 403 are further able to add additional metadata information using text and voice input systems or applications. For instance, UE 401 may access a file or data located on server 403. The user of UE 401 may add metadata to the accessed file or data through text or voice inputs or commands on UE 401. Server 403 is then able to add the metadata to the file or data based on the text or voice inputs on UE 401.

Exemplary embodiments of server 403 are also able to cross-reference metadata of files recorded by a media capture device with metadata of files from other user equipments. Server 403 can then perform certain actions based on the cross-referenced data. For instance, server 403 can read metadata indicating that a certain file or data was created by a certain user equipment, media capture device, or user. In response to reading that the metadata indicates a certain user equipment, media capture device, or user, server 403 can organize the file or data in a predetermined manner or folder, send the file or data to another remote device, or catalog the file or data in a predetermined manner.

Exemplary embodiments of server 403 are able to recognize patterns in metadata collected from a media capture device's sensors or a user equipment's sensors and use this metadata to apply actions to files on the media capture device based on the metadata. For instance, a media capture device's sensors or a user equipment's sensors may create metadata for files or data that correspond to location, time, altitude, weather, or other known elements. Server 403 can recognize patterns in this metadata and apply predetermined actions. For instance, a user may catalog all video files in a particular folder on server 403 based on the location the video was taken. Or, a user may send all video files taken in the winter to Google Drive. Server 403 can recognize these and other patterns based on the metadata.

Exemplary embodiments of server 403 are also able to update metadata on files generated by a media capture device or a user equipment. Exemplary embodiments of server 403 can use metadata of files or data to organize and filter the files or data. In another exemplary embodiment server 403 is able to perform searches of files or data it maintains using the metadata on the files or data it maintains by, for example, name, folder, location, and the like.

Block 408 then specifies that server 403 renders views of files on UE and other devices. Sever 403 maintains files in its memory and is able to either stream low resolution copies of the files, or it can simply render views of which files are available for viewing and editing to a UE, such as UE 401. In another exemplary embodiment, server 403 can be connected to a media capture device or other UE. In this embodiment, server 403 can render views of files to UE 401 of files on the media capture device or other UE. At block 410, server 403 is able to connect to the internet and transfer files to cloud servers or external web destinations, such as Google drive, Dropbox, or other UEs. Server 403 can further send or transfer files to software programs. Server 403 is also able to send the corresponding metadata with transferred files whether the files are sent to other servers, UEs, web servers, private servers, or even software programs.

Referring to FIG. 5, presented is a logic flow diagram in accordance with a method, apparatus, and computer-readable medium for performing exemplary embodiments of this disclosure. Block 502 presents (a) creating, by a user equipment (UE), a data, the UE having a persistent memory; (b) transferring, by the UE, the data to a server; and (c) editing, by the UE, the data, wherein only a portion of the data is maintained in the persistent memory during the editing; and (d) in response to completion of the editing, automatically removing, by the UE, the data from the persistent memory. Then block 504 specifies wherein the data comprises videos, photographs, and audio recordings.

Some of the non-limiting implementations detailed above are also summarized at FIG. 5 following block 504. Block 506 relates to wherein the server is one of a local area network device and a wide area network. Block 508 then specifies wherein the editing comprises streaming a portion of the transferred data. Block 510 then further specifies wherein the editing comprises cutting, cropping, combining, titling, transitioning, or filtering the data.

Reference is now made to FIG. 6, which presents another logic flow diagram that illustrates a method, apparatus, and computer-readable medium for performing exemplary embodiments of this disclosure. Block 602 presents (a) receiving, by a server, a data; (b) transmitting, by the server, a second data, the second data being based on the data; (c) receiving, by the server, a third data, the third data comprising changes to the second data; and (d) editing, by the server, the data based on the received third data. Block 604 then specifies wherein the data comprises videos, photographs, or audio recordings.

The diagram continues at block 606 which states wherein the second data comprises a portion of the data, and wherein the transmitting comprises streaming the second data. Block 608 further specifies wherein the server is a local area network device. Block 610 relates to wherein the editing comprises cutting, cropping, combining, titling, transitioning, or filtering the data.

Reference is now made to FIG. 7, which presents another logic flow diagram that illustrates a method, apparatus, and computer-readable medium for performing exemplary embodiments of this disclosure. Block 702 presents (a) creating, by a first user equipment (UE), a data; (b) transferring, by the first UE, the data to a server; (c) editing, by a second UE, the data, the second UE comprising persistent memory, wherein only a portion of the data is maintained in the persistent memory of the second UE during the editing; and (d) in response to completion of the editing, automatically removing, by the second UE, the data from the persistent memory of the second UE. Block 704 goes on to state wherein the data comprises videos, photographs, and audio recordings.

FIG. 7 continues at block 706 which specifies wherein the server is one of a local area network device and a wide area network. Block 708 relates to wherein the editing comprises streaming a portion of the transferred data to the second UE. Block 710 then indicates wherein the editing comprises cutting, cropping, combining, titling, transitioning, or filtering the data.

The logic diagrams of FIG. 5, FIG. 6, and FIG. 7 may be considered to illustrate the operation of a method, a result of execution of computer program instructions stored in a computer-readable medium. The logic diagram of FIG. 5, FIG. 6, and FIG. 7 may also be considered a specific manner in which components of the device are configured to cause that device to operate, whether such a device is an electronic device, camera, digital camera, digital video camera, server, web server, laptop, desktop, tablet, smartphone, mobile phone or other device, or one or more components thereof. The various blocks shown in FIG. 5, FIG. 6, and FIG. 7 may also be considered as a plurality of coupled logic circuit elements constructed to carry out the associated function(s), or specific result of strings of computer program instructions or code stored in memory.

Various embodiments of the computer-readable medium include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. Various embodiments of the processor include but are not limited to general purpose computers, special purpose computers, microprocessors digital signal processors and multi-core processors.

Reference is now made to FIG. 8 for illustrating a simplified block diagram of the various electronic devices and apparatus that are suitable for use in practicing exemplary embodiments of the present disclosure. Shown in FIG. 8 is a user equipment (UE) 802, server 806, and user equipment (UE) 804. Server 806 is adapted for communication over wireless link A or wired link A with UE 802. Similarly, server 806 is adapted for communication over wireless link B or wired link B with UE 804. Exemplary embodiments of server 806 include a single server or a plurality of servers. Exemplary embodiments of wireless link A, wireless link B, wired link A, and wired link B include both direct connections and indirect connections through either a wide area network (WAN) and/or a local area network (LAN). Exemplary embodiments of wireless link A, wireless link B, wired link A, and wired link B further include communications through the internet or other network.

UE 802 may include processing means such as a processing system and/or at least on edata processor (DP) 802A, storing means such as at least one computer-readable medium or computer-readable memory (MEM) 802B storing at least one computer program (PROG) 802C, and also communicating means such as a transmitter (TX) 802D and receiver (RX) 802E for bidirectional wired or wireless communications with server 806 via one or more antennas 802F as known in the art. UE 802 further includes a media capture device 802G for capturing audio and/or video media. UE 802 also includes a media viewing device 802H for viewing audio and/or video media. Exemplary embodiments of media viewing device 802H include displays, digital video displays, and speakers or other known audio output devices.

Server 806 includes processing means such as at least one data processor (DP) 806A, storing means such as at least one computer-readable medium or computer-readable memory (MEM) 806B storing at least one computer program (PROG) 806C, and communicating means such as a transmitter (TX) 806D and a receiver (RX) 806E for bidirectional wired or wireless communications with other devices known in the art.

UE 804 includes processing means such as at least one data processor (DP) 804A, storing means such as at least one computer-readable medium or computer-readable memory (MEM) 804B storing at least one computer program (PROG) 804C, and communicating means such as a transmitter (TX) 804D and a receiver (RX) 804E for bidirectional wired or wireless communications with other devices via one or more antennas 804F as known in the art. UE 804 also includes a media viewing device 804H for viewing audio and/or video media. Exemplary embodiments of media viewing device 804H include displays, digital video displays, and speakers or other known audio output devices.

Various embodiments of UE 802 and UE 804 include, but are not limited to: laptop computers, desktop computers, mobile phones including smart phones, cameras, digital cameras, digital video cameras, personal portable digital devices having wired or wireless communication capabilities including but not limited to laptop/palmtop/tablet computers.

At least one of the PROGs 802C or 804C in UE 802 or UE 804 is assumed to include program instructions that, when executed by the associated DP 802A, 804A, enable the device to operate in accordance with embodiments of the present disclosure, as detailed above. Server 806 may also include software stored in its MEM 806B to implement certain aspects of these teachings. In these regards, embodiments of this disclosure may be implemented at least in part by computer software stored in the MEM 802B, 804B, 806B which is executable by DP 802A of UE 802, DP 804A of UE 804, and/or DP 806A of server 806, or by hardware, or by a combination of tangibly stored software and hardware (and tangibly stored firmware). Electronic devices implementing these aspects of the disclosure need not be the entire devices as depicted in FIG. 8, but embodiments may be implemented by one or more components of same such as the above described tangibly stored software, hardware, firmware, and DP.

Various embodiments of the computer readable MEMs 802B, 804B, and 806B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 802A, 804A, and 806A include but are not limited to general purpose computers, special purpose computers, mircroprocessors, digital signal processors (DSPs) and multi-core processors.

It is to be understood that any feature described in relation to any one embodiment may be used alone, or in combination with other features described, and may also be used alone, or in combination with one or more features of any other of the embodiments, or any combination of any other of the embodiments. The presently disclosed embodiments are therefore considered in all respects to be illustrative and not restrictive. Furthermore, equivalents and modifications not described above may also be employed without departing from the scope of this disclosure, which is defined in the accompanying claims.

Other non-limiting embodiments of the present disclosure include the following embodiments.

Embodiment 1

A method of managing data, the method comprising: (a) receiving, by a server, a data; (b) transmitting, by the server, a second data, the second data being based on the data; (c) receiving, by the server, a third data, the third data comprising changes to the second data; and (d) editing, by the server, the data based on the received third data.

Embodiment 2

The method according to embodiment 1, wherein the data comprises videos, photographs, or audio recordings.

Embodiment 3

The method according to embodiment 1, wherein the second data comprises a portion of the data, and wherein the transmitting comprises streaming the second data.

Embodiment 4

The method according to embodiment 1, wherein the server is a local area network device.

Embodiment 5

The method according to embodiment 1, wherein the editing comprises cutting, cropping, combining, titling, transitioning, or filtering the data.

Embodiment 6

An apparatus for managing data, the apparatus comprising at least one processor and a memory storing computer instructions executable by the at least one processor, wherein the memory and the computer instructions and the at least one processor are configured to cause the apparatus to at least: (a) receive a data; (b) transmit a second data, the second data being based on the data; (c) receive a third data, the third data comprising changes to the second data; and (d) editing the data based on the received third data.

Embodiment 7

The apparatus according to embodiment 6, wherein the data comprises videos, photographs, or audio recordings.

Embodiment 8

The apparatus according to embodiment 6, wherein the second data comprises a portion of the data.

Embodiment 9

The apparatus according to embodiment 6, wherein the apparatus is a local area network device.

Embodiment 10

The apparatus according to embodiment 6, wherein the editing comprises cutting, cropping, combining, titling, transitioning, or filtering the data.

Embodiment 11

A non-transitory computer-readable medium tangibly storing computer program instructions which when executed by a processor, cause the processor to at least: (a) receive a data; (b) transmit a second data, the second data being based on the data; (c) receive a third data, the third data comprising changes to the second data; and (d) editing the data based on the received third data.

Embodiment 12

The non-transitory computer-readable medium according to embodiment 11, wherein the data comprises videos, photographs, or audio recordings.

Embodiment 13

The non-transitory computer-readable medium according to embodiment 13, wherein the second data comprises a portion of the data.

Embodiment 14

The non-transitory computer-readable medium according to embodiment 11, wherein the apparatus is a local area network device.

Embodiment 15

The non-transitory computer-readable medium according to embodiment 11, wherein the editing comprises cutting, cropping, combining, titling, transitioning, or filtering the data.

Embodiment 1a

A method for managing data, the method comprising: (a) accessing, by a user equipment (UE), a data, the UE having a volatile memory; (b) receiving, by the UE, a portion of the data; and (c) editing, by a UE, the data, wherein the data is maintain on only the volatile memory of the UE during the editing.

Embodiment 2a

The method according to embodiment 1a, wherein the data comprises videos, photographs, and audio recordings.

Embodiment 3a

The method according to embodiment 1a, wherein the editing comprises streaming a portion of the data, wherein the viewed data is maintain on only the volatile memory of the UE.

Embodiment 4a

The method according to embodiment 1a, wherein the editing comprises cutting, cropping, combining, titling, transitioning, or filtering the data.

Embodiment 5a

An apparatus for managing data, the apparatus comprising at least one processor, a volatile memory and a memory storing computer instructions executable by the at least one processor, wherein the memory and the computer instructions and the at least one processor are configured to cause the apparatus to at least: (a) access a data; (b) receive a portion of the data; and (c) edit the data, wherein the data is maintain on only the volatile memory of the apparatus during the editing.

Embodiment 6a

The apparatus according to embodiment 5a, wherein the data comprises videos, photographs, and audio recordings.

Embodiment 7a

The apparatus according to embodiment 5a, wherein the editing comprises streaming a portion of the data, wherein the viewed data is maintain on only the volatile memory of the apparatus.

Embodiment 8a

The apparatus according to embodiment 5a, wherein the editing comprises cutting, cropping, combining, titling, transitioning, or filtering the data.

Embodiment 9a

A non-transitory computer-readable medium tangibly storing computer program instructions which when executed by a processor, cause the processor to at least: (a) access a data; (b) receive a portion of the data; and (c) edit the data, wherein the data is maintain on only the volatile memory of a UE during the editing.

Embodiment 10a

The non-transitory computer-readable medium according to embodiment 9a, wherein the data comprises videos, photographs, and audio recordings.

Embodiment 11a

The non-transitory computer-readable medium according to embodiment 9a, wherein the editing comprises streaming a portion of the data, wherein the viewed data is maintain on only the volatile memory of the UE.

Embodiment 12a

The non-transitory computer-readable medium according to embodiment 9a, wherein the editing comprises cutting, cropping, combining, titling, transitioning, or filtering the data.

Embodiment 1b

A method for managing data, the method comprising: (a) creating, by a user equipment (UE), a data, the UE having a persistent memory; (b) transferring, by the UE, the data to a server; (c) editing, by the UE, the data, wherein only a portion of the data is maintained in the persistent memory during the editing; and (d) in response to completion of the editing, automatically removing, by the UE, the data from the persistent memory.

Embodiment 2b

The method according to embodiment 1b, wherein the data comprises videos, photographs, and audio recordings.

Embodiment 3b

The method according to embodiment 1b, wherein the server is one of a local area network device and a wide area network.

Embodiment 4b

The method according to embodiment 1b, wherein the editing comprises streaming a portion of the transferred data.

Embodiment 5b

The method according to embodiment 1b, wherein the editing comprises cutting, cropping, combining, titling, transitioning, or filtering the data.

Embodiment 6b

An apparatus for managing data, the apparatus comprising at least one processor and a memory storing computer instructions executable by the at least one processor, wherein the memory and the computer instructions and the at least one processor are configured to cause the apparatus to at least: (a) create a data; (b) transmit the data to a server; (c) edit the data, wherein only a portion of the data is maintained in a persistent memory of the apparatus during the editing; and (d) in response to completion of the editing, automatically removing the data from the persistent memory.

Embodiment 7b

The apparatus according to embodiment 6b, wherein the data comprises videos, photographs, and audio recordings.

Embodiment 8b

The apparatus according to embodiment 6b, wherein the server is one of a local area network device and a wide area network device.

Embodiment 9b

The apparatus according to embodiment 6b, wherein the editing comprises streaming a portion of the transferred data.

Embodiment 10b

The apparatus according to embodiment 6b, wherein the editing comprises cutting, cropping, combining, titling, transitioning, or filtering the data.

Embodiment 11b

A non-transitory computer-readable medium tangibly storing computer program instructions which when executed by a processor, cause the processor to at least: (a) create a data; (b) transmit the data to a server; and (c) edit the data, wherein only a portion of the data is maintained in a persistent memory during the editing; and (d) in response to completion of the editing, automatically removing the data from the persistent memory.

Embodiment 12b

The non-transitory computer-readable medium according to embodiment 11b, wherein the data comprises videos, photographs, and audio recordings.

Embodiment 13b

The non-transitory computer-readable medium according to embodiment 11b, wherein the server is one of a local area network device and a wide area network device.

Embodiment 14b

The non-transitory computer-readable medium according to embodiment 11b, wherein the editing comprises streaming a portion of the transferred data.

Embodiment 15b

The non-transitory computer-readable medium according to embodiment 11b, wherein the editing comprises cutting, cropping, combining, titling, transitioning, or filtering the data.

The invention claimed is:
1. A method of managing data, the method comprising:
(a) creating, by a first user equipment (UE), a high resolution video data;
(b) transferring, by the first UE, the high resolution video data to a server;
(c) in response to receiving the high resolution video data at the server, directly transmitting to a second user equipment (UE), comprising at least one of non-vola- tile and volatile memory, an indication of a presence of the high resolution video data;

(d) in response to receiving a request for the high resolution data from the second user equipment, directly receiving, by the second UE, a second data from the server, wherein the second data (i) is created by the server based on the high resolution video data, and (ii) is a low resolution video segment of the high resolution video data, and wherein the second UE maintains the second data in the at least one of non- volatile and volatile memory;

(e) editing, by the second UE, the second data;

(f) directly transmitting to the server, by the second UE, a third data comprising changes to the low resolution video segment of the second data;

(g) in response to receiving the third data, creating by the server a metadata associated with the high resolution video data, wherein the metadata is at least one of GPS information, accelerometer information, gyroscope information, temperature, and weather information; and (h) in response to receiving the third data, editing, by the server, the high resolution video data according to the changes to the low resolution video segment of the edited second data;

wherein directly receiving and the directly transmitting of the second and third data is performed such that the second data and the third data does not pass through an intermediate device or network.

2. The method according to claim 1, wherein the editing comprises cutting, cropping, combining, titling, transitioning, or filtering the data.

3. The method according to claim 1, wherein the high resolution video data is directly transferred to the server by the first UE.

4. An apparatus for managing data, the apparatus comprising at least one processor and a memory storing computer instructions executable by the at least one processor, wherein the memory and the computer instructions and the at least one processor are configured to cause the apparatus to at least:

(a) receive a high resolution data from a media capture device, the high resolution data comprising at least one of videos and audio recordings;

(b) in response to receiving the high resolution data, directly transmit to a user equipment comprising at least one of non-volatile and volatile memory an indication of a presence of the high resolution data;

(c) in response to receiving a request for the high resolution data from the user equipment, directly transmit a second data to the at least one of non-volatile and volatile memory of the user equipment, the second data being a low resolution segment of the high resolution data, and wherein the second data is created by the apparatus based on the high resolution data;

(d) directly receive a third data from the user equipment, the third data comprising changes to the low resolution segment of the second data;

(e) in response to receiving the third data, creating by the apparatus a metadata associated with the high resolution data, wherein the metadata is at least one of GPS information, accelerometer information, gyroscope information, temperature, and weather information;

(f) edit, by the at least one processor, the high resolution data based on the changes to the low resolution segment of the received third data;

wherein the directly receiving and the directly transmitting of the second data and the third data is performed such that the second data and the third data does not pass through an intermediate device or network.

5. The apparatus according to claim 4, wherein the editing comprises cutting, cropping, combining, titling, transitioning, or filtering the data.

6. The apparatus according to claim 4, wherein the apparatus directly receives the high resolution data from the media capture device.

7. A non-transitory computer-readable medium tangibly storing computer program instructions which when executed by an apparatus having a processor, cause the processor to at least:

(a) receive a high resolution video data from a media capture device;

(b) in response to receiving the high resolution data, directly transmit to a user equipment comprising at least one of non-volatile and volatile memory an indication of a presence of the high resolution video data;

(c) in response to receiving a request for the high resolution data from the user equipment, directly transmit a second data to the at least one of non-volatile and volatile memory of the user equipment, the second data having metadata and being a low resolution video segment of the high resolution video data, and wherein the second data is created by the apparatus based on the high resolution video data;

(d) directly receive a third data from the user equipment, the third data comprising changes to only the metadata of the low resolution video segment of the second data;

(e) in response to receiving the third data, creating by the processor a metadata associated with the high resolution video data, wherein the metadata associated with the high resolution video data is at least one of GPS information, accelerometer information, gyroscope information, temperature, and weather information; and (f) in response to receiving the third data, edit, by the at least one processor, the high resolution video data based on the changes to the low resolution video segment of the received third data;

wherein the directly receiving and the directly transmitting of the second data and the third data is performed such that the second data and the third data does not pass through an intermediate device or network.

8. The non-transitory computer-readable medium according to claim 7, wherein the editing comprises cutting, cropping, combining, titling, transitioning, or filtering the data.

9. The non-transitory computer-readable medium according to claim 7, wherein the processor directly receives the high resolution video data from the media capture device.

* * * * *